United States Patent
Best et al.

(10) Patent No.: US 7,188,388 B2
(45) Date of Patent: Mar. 13, 2007

(54) VACUUM CLEANER WITH DETACHABLE CYCLONIC VACUUM MODULE

(75) Inventors: Michael F. Best, Rockford, MI (US); Douglas J. Medema, Belding, MI (US); David E. McDowell, Grand Rapids, MI (US)

(73) Assignee: BISSELL Homecare, Inc., Grand Rapids, MI (US)

(*) Notice: Subject to any disclaimer, the term of this patent is extended or adjusted under 35 U.S.C. 154(b) by 530 days.

(21) Appl. No.: 10/604,401

(22) Filed: Jul. 17, 2003

(65) Prior Publication Data

US 2004/0216263 A1 Nov. 4, 2004

Related U.S. Application Data

(63) Continuation-in-part of application No. 10/249,113, filed on Mar. 17, 2003, now abandoned, which is a continuation-in-part of application No. 09/849,143, filed on May 4, 2001, now abandoned.

(60) Provisional application No. 60/319,849, filed on Jan. 10, 2003, provisional application No. 60/269,044, filed on Feb. 15, 2001, provisional application No. 60/201,933, filed on May 5, 2000.

(51) Int. Cl.
*A47L 9/16* (2006.01)

(52) U.S. Cl. .............. 15/329; 15/353; 15/410; 55/DIG. 3

(58) Field of Classification Search ............... 15/328, 15/329, 350, 353, 410; 55/DIG. 10
See application file for complete search history.

(56) References Cited

U.S. PATENT DOCUMENTS

| | | | |
|---|---|---|---|
| 4,393,536 A | 7/1983 | Tapp | 15/328 |
| 5,267,371 A | 12/1993 | Soler et al. | 15/327.5 |
| 5,287,591 A | 2/1994 | Rench et al. | 15/328 |
| 5,307,538 A | 5/1994 | Rench et al. | 15/352 |
| 5,309,600 A | 5/1994 | Weaver et al. | 15/328 |
| 5,363,535 A | 11/1994 | Rench et al. | 15/344 |
| 5,524,321 A | 6/1996 | Weaver et al. | 15/329 |
| 5,715,566 A | 2/1998 | Weaver et al. | 15/320 |
| 5,819,364 A | 10/1998 | Sham | 15/320 |
| 6,058,559 A * | 5/2000 | Yoshimi et al. | 15/328 |
| 6,094,775 A | 8/2000 | Behmer | 15/329 |
| 6,146,434 A * | 11/2000 | Scalfani et al. | 15/353 |
| 6,311,366 B1 | 11/2001 | Sepke et al. | 15/412 |
| 6,375,720 B2 * | 4/2002 | Embree et al. | 15/347 |
| 6,457,205 B1 | 10/2002 | Conrad | 15/319 |
| 6,536,072 B2 * | 3/2003 | Thur et al. | 15/323 |
| 6,961,975 B2 * | 11/2005 | Park et al. | 15/329 |
| 2002/0011050 A1 | 1/2002 | Hansen et al. | 55/337 |
| 2002/0194696 A1 | 12/2002 | Sergyeyenko et al. | 15/339 |
| 2003/0221278 A1 | 12/2003 | Oh | |
| 2004/0261212 A1* | 12/2004 | Park et al. | 15/328 |
| 2004/0261213 A1* | 12/2004 | Park et al. | 15/328 |

FOREIGN PATENT DOCUMENTS

| | | |
|---|---|---|
| EP | 1195125 | 4/2002 |
| GB | 2384451 | 7/2003 |

* cited by examiner

*Primary Examiner*—Theresa T. Snider
(74) *Attorney, Agent, or Firm*—McGarry Bair PC

(57) ABSTRACT

A multi-use vacuum cleaner capable of use as an upright vacuum or as a detachable vacuum module further comprising a cyclonic dirt separator has a detachable vacuum module selectively mounted to the base and support member of an upright vacuum cleaner. The vacuum module includes the vacuum motor, motor driven fan, cyclonic dirt separator and hose. The vacuum cleaner may be operated as an upright vacuum, or alternatively, the module can be separated from the base assembly and may be used independently of and at a great distance from the base assembly for a wide variety of cleaning purposes.

13 Claims, 6 Drawing Sheets

VACUUM CLEANER WITH DETACHABLE CYCLONIC VACUUM MODULE

CROSS REFERENCE TO RELATED APPLICATIONS

This application claims the benefit of U.S. provisional application Ser. No. 60/319,849, filed Jan. 10, 2003, which is incorporated herein in its entirety, and is a continuation in part of U.S. patent application Ser. No. 10/249,113, filed Mar. 17, 2003 now abandoned, a continuation in part of Ser. No. 09/849,143, filed May 4, 2001 now abandoned, which claims the benefit of U.S. Provisional Application 60/201,933, filed May 5, 2000 and U.S. Provisional Application 60/269,044, filed Feb. 15, 2001, all of which are incorporated herein in their entirety.

BACKGROUND OF INVENTION

1. Field of the Invention

This invention relates to a multi-use vacuum cleaner, and, more particularly, to a vacuum cleaner having a vacuum module comprising a cyclonic dirt separator which is detachably mounted to a power foot and upright support member.

2. Description of the Related Art

A multi-use vacuum cleaner capable for use as an upright vacuum or as a detachable vacuum module is disclosed in U.S. Pat. No. 5,524,321 to Weaver et al., issued Jun. 11, 1996 and U.S. Pat. No. 5,309,600 to Weaver et al. issued May 10, 1994. A detachable vacuum module is selectively mounted to the foot and support member of an upright vacuum cleaner. The vacuum module includes the vacuum motor, motor driven fan, vacuum bag and hose. The vacuum cleaner may be operated as an upright vacuum, or alternatively, the module can be separated from the foot and upright support member to be used independently of and at a great distance from the foot and upright support member for a wide variety of cleaning purposes.

The U.S. Patent Application Publication No. US2002/0011050 to Hansen et al., published Jan. 31, 2002, discloses a suction cleaner with a cyclonic dirt separator comprising a dirt collection assembly including a cyclonic separator having an inlet aperture and an outlet aperture, and a suction source fluidly connected with the cyclonic separator. In one embodiment, the cyclonic dirt separator includes a separator plate cooperating with the housing to separate the cyclonic separator from a dirt collecting cup. The separator plate has an outer diameter smaller than the inner diameter of the dirt tank, creating a gap between the outer edge of the separator plate and the inner wall of the cyclonic separator.

SUMMARY OF INVENTION

According to the invention, a multi-use upright vacuum cleaner combines the ease of use and compact configuration of an upright vacuum cleaner with the portability and multiple applications of a canister vacuum wherein the main filtration is accomplished with a cyclonic dirt separator. The vacuum cleaner has a foot assembly having a suction nozzle and adapted to move along a surface to be cleaned, an upright handle assembly pivotally mounted to the foot assembly for manipulation of the foot assembly along the surface to be cleaned.

The handle assembly includes a module platform pivotally mounted to the foot assembly, an elongated structural support, and a portable cleaning module. The elongated structural support is rigidly mounted at a lower portion to the module platform and forms a handle grip at an upper portion. The portable cleaning module is detachably mounted as a unit to the module platform and includes a module housing, a dirt separator mounted in the module housing for separating dust and dirt from dirt laden air, a suction conduit having a first end connected to the module housing in fluid communication with the dirt separator and a second with a removable coupling. A motor-driven fan is supported in the module housing for creating suction within the suction conduit and for moving the dirt laden air through the dirt separator.

A working air conduit is connected at a first end to the suction nozzle in the foot assembly and is removably connected at another end to the suction conduit removable coupling. When the portable cleaning module is mounted on the module platform, the vacuum cleaner functions as an upright vacuum cleaner and the motor-driven fan draws dirt laden air from the suction nozzle in the foot assembly to the suction conduit and moves the dirt laden air to the dirt separator for separation of dirt from air. When the portable cleaning module is removed from the module platform, the portable vacuum module can function by itself as a portable vacuum cleaner and the motor-driven fan draws dirt laden air from the second end of the suction conduit and moves the dirt laden air to the dirt separator for separation of dirt from air.

According to the invention, the dirt separator includes a cyclone separation chamber into which the dirt laden air is tangentially introduced through an inlet thereto.

In a preferred embodiment of the invention, the elongated structural support comprises a pair of spaced elongated frames that are joined at upper portions thereof and the portable cleaning module is positioned between the spaced elongated frames when it is mounted on the module platform. Preferably, the spaced elongated frames form a handle grip at an upper portion thereof. In addition, the spaced elongated frames are tubes.

Typically, the suction conduit is at least in part flexible for movement of the second end thereof with respect to the module housing during use of the portable cleaning module when it is detached from the module platform. Cleaning tools, carried by the elongated structural support can be mounted on the second end of the suction conduit when the portable cleaning module is detached from the module platform. In one embodiment, the other end of the working air conduit is integrated into the module platform and is formed by an opening in the module platform. The suction conduit removable coupling is removably mounted to the opening in the module platform.

In one embodiment, the cyclone separation chamber has an outlet and the motor driven fan has an inlet connected to the cyclone separator chamber outlet. In another embodiment, the motor driven fan has an inlet connected to the first end of the suction conduit and an outlet connected to the cyclone separator chamber inlet.

Typically, the dirt separator further includes a dirt cup removably mounted in the module housing beneath the cyclone separator to collect dirt separated from air therein. Further, the module housing further includes a handle integrally formed at an upper portion thereof for carrying the portable cleaning module when it is detached from the module platform.

In one embodiment, the portable cleaning module has a handle, preferably at an upper portion thereof, for hand carrying the cleaning module.

DETAILED DESCRIPTION

Figure 1:
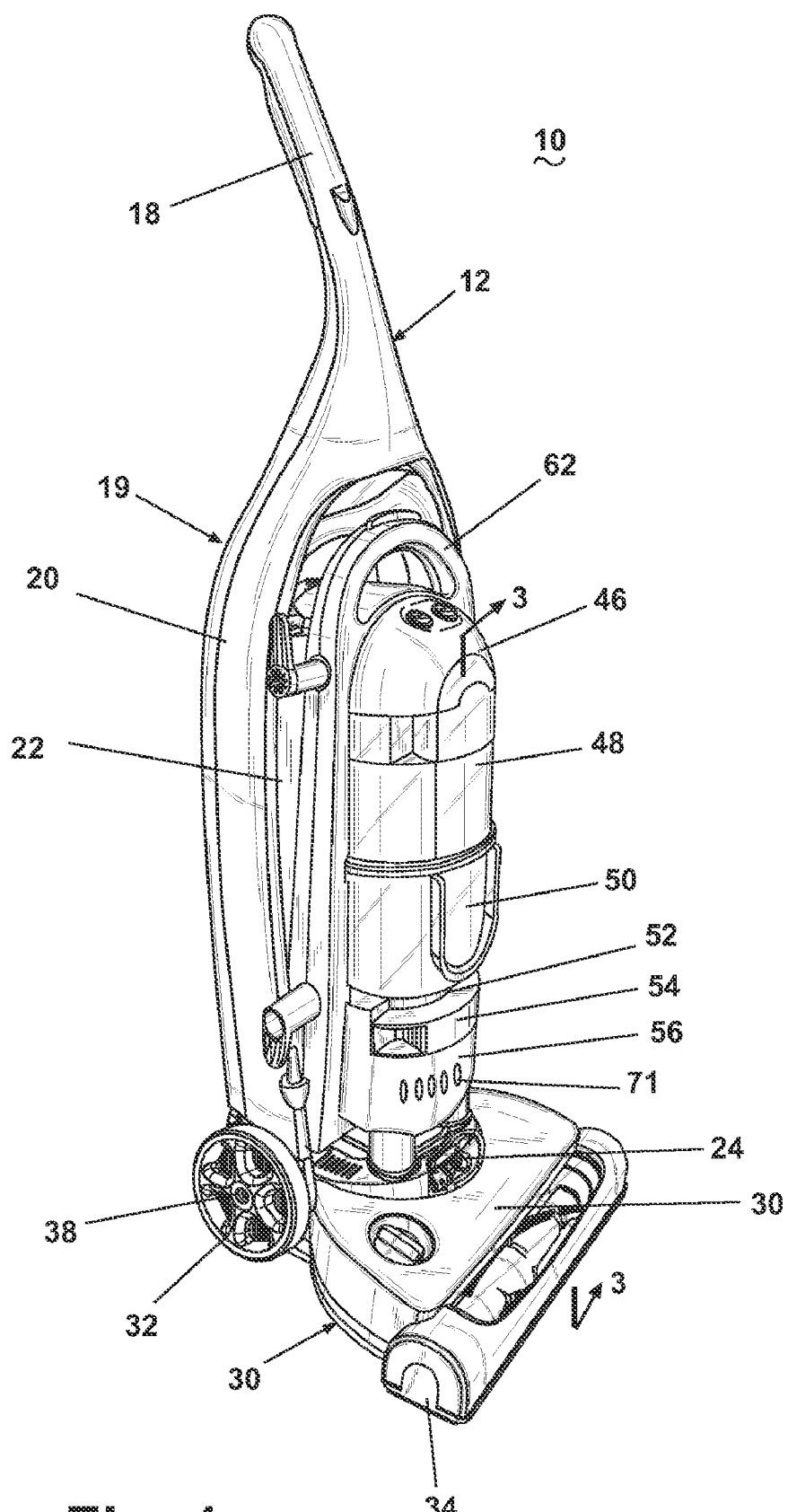
FIG. 1 is a perspective view of the multi-use vacuum cleaner having a detachable vacuum module with cyclonic dirt separation.
Figure 2:
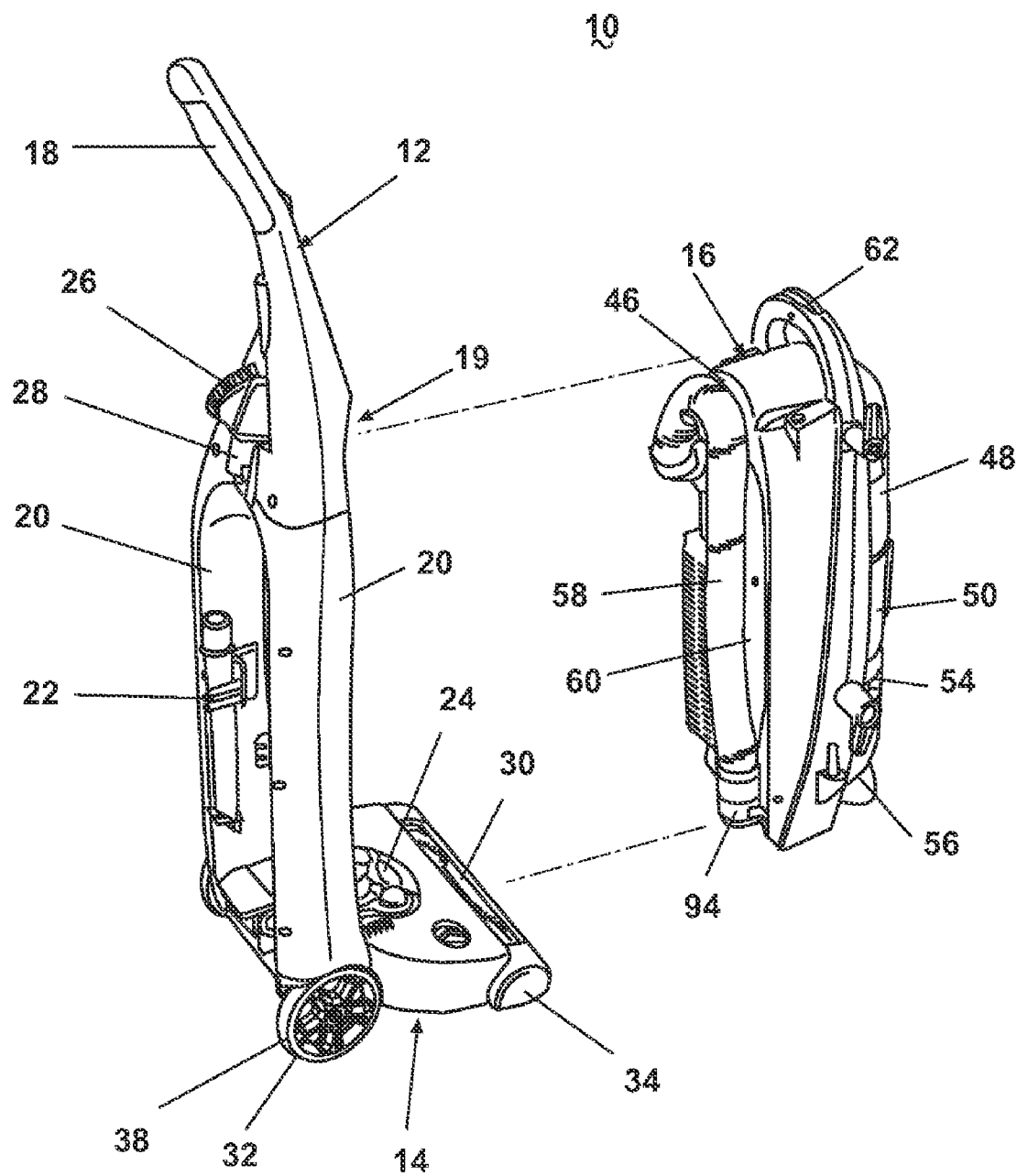
FIG. 2 is a rear quarter perspective view of the vacuum module separated from the upright vacuum cleaner foot assembly.

With reference to FIGS. 1 and 2, an upright vacuum cleaner 10 comprises an upright handle assembly 12 and a foot assembly 14. The upright handle assemble 12 comprises a module platform 24, an elongated structural support 19 and a detachable cyclonic vacuum module 16. The elongated structural support 19 is formed by a pair of spaced apart elongated frames in the form of support tubes 20 that are joined to form a grip 18 at an upper portion thereof. The support tubes 20 merge in an arc-like configuration at an upper end of the support tubes 20 and merge into the grip 18. A mechanical stop 22 is positioned approximately midway between a lower end of each support tube 20 and the arc-like configuration. The stop 22 is a block-like structure to provide lateral support for the detachable cyclonic vacuum module 16. The module platform 24 is rigidly attached to the lower ends of the support tubes 20 in a generally perpendicular fashion. Wheel axle bearings (not shown) extend through the first end of the support tube 20 in a horizontal direction. The upright handle assembly 12 including the module platform 24 rotates about the wheel axle bearings. An upholstery tool 26 is removably attached to a recessed upholstery tool caddy 28 located on an upper rearward surface of the upright handle assembly 12.

Figure 3:
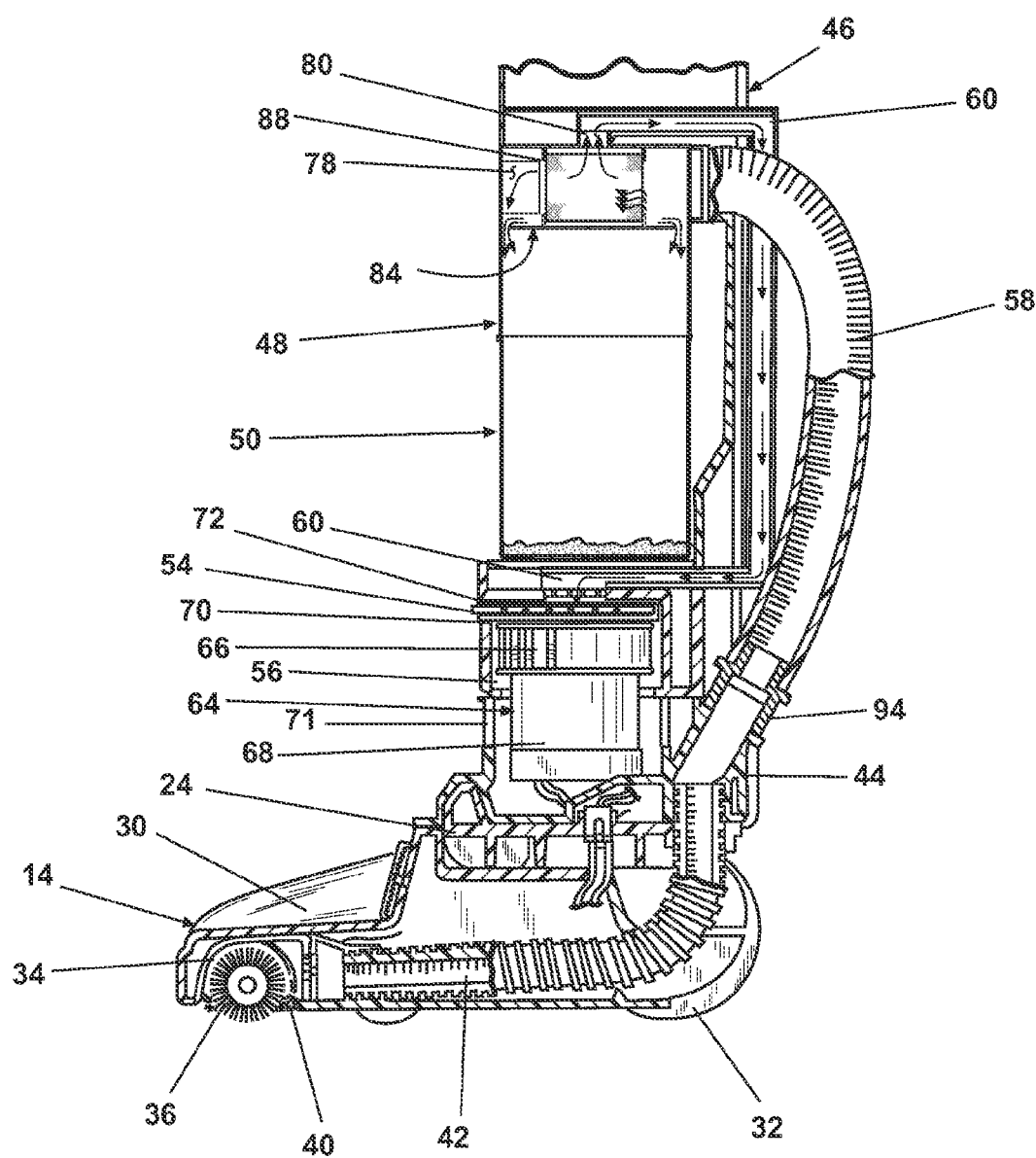
FIG. 3 is a partial sectional view of the vacuum module and foot assembly taken along lines 3—3 of FIG. 1.

Referring to FIGS. 1, 2 and 3, the foot assembly 14 further comprises a foot housing 30, a wheel 32, a brush chamber 34, and a working air path described in more detail below. The brush chamber 34 comprises a cavity formed horizontally at a forward section of the foot housing 30. Brush chamber 34 further comprises a brush 36. Brush 36 is a generally well known horizontal brush roll that is driven by a separate brush motor (not shown) located within the foot housing 30. An electric switch (not shown) on the detachable cyclonic vacuum module 16 selectively supplies power to the brush motor. A wheel axle 38 passes through the wheel axle bearings in the support tubes 20 and is rigidly fixed to either side of the foot housing 30. Wheel 32 is rotatably mounted to axle 38.

Referring to FIG. 3, the working air path comprises a suction nozzle aperture 40, a flexible working air conduit 42, and an air conduit interface 44. Suction nozzle aperture 40 is formed on a lower surface of brush chamber 34. Space between the brush 36 and the brush chamber 34 allow air to pass through brush chamber 34. Flexible working air conduit 42 is fluidly connected to suction nozzle 40 on one end, is routed through a lower portion of the foot housing 30 and terminates at the air conduit interface 44 on an upper rearward surface of the foot housing 30. Thus, an uninterrupted air path is created through the foot housing from the suction nozzle 40 to the air conduit interface 44. A more complete description of a suitable foot assembly 14 and of a suitable mounting between the module platform 24 and the detachable module 16 is disclosed in U.S. Pat. Nos. 5,524,321 and 5,309,600 to Weaver et al., which are incorporated herein by reference in their entirety.

Referring to FIGS. 1, 2 and 3, the detachable cyclonic vacuum module 16 further comprises a module housing 46, a cyclonic separator 48, a removable dirt cup 50, a dirt cup latch 52, a filter tray assembly 54, fan chamber 56, an external hose 58 and an outlet air conduit 60. The module housing 46 provides structure for the detachable cyclonic vacuum module 16. Cavities are formed within the module housing 46 to support the cyclonic separator 48, the removable dirt cup 50, and the fan chamber 56. A handle 62 is integrally formed in at an upper surface of the module housing 46. Handle 62 provides a convenient location for a user to grasp and lift the detachable cyclonic vacuum module 16. The external hose 58 has at one end a hose fitting 94 that is removably received in air conduit interface 44 and the other end is connected to cyclone air inlet aperature 78.

Referring to FIG. 3, a fan motor assembly 64 further comprises a fan 66 and a motor 68. Fan motor assembly 64 is located vertically within the fan chamber 56. Fan 66 further comprises a fan air inlet 70 and a plurality of working air exhaust apertures 71. Optionally, a post motor filter can be placed in the working air exhaust between the fan motor assembly 64 and the exhaust apertures 71. Filter tray 54 is a generally box like structure with solid side-walls supported by a framework structure to create a permeable floor. Filter tray 54 is removably inserted into a corresponding cavity in the module housing 46 between the fan chamber 56 and the dirt cup latch 52. A permeable foam filter 72 fits within the perimeter of the filter tray 54 and is supported by the filter tray floor. Foam filter 72 is air permeable so that the air passes through the topside of the foam filter, through the foam filter, and exits the bottom side of the foam filter adjacent to the fan inlet 70. Foam filter 72 removes fine particles from the airstream prior to the airstream entering the fan inlet 70.

Figure 5:
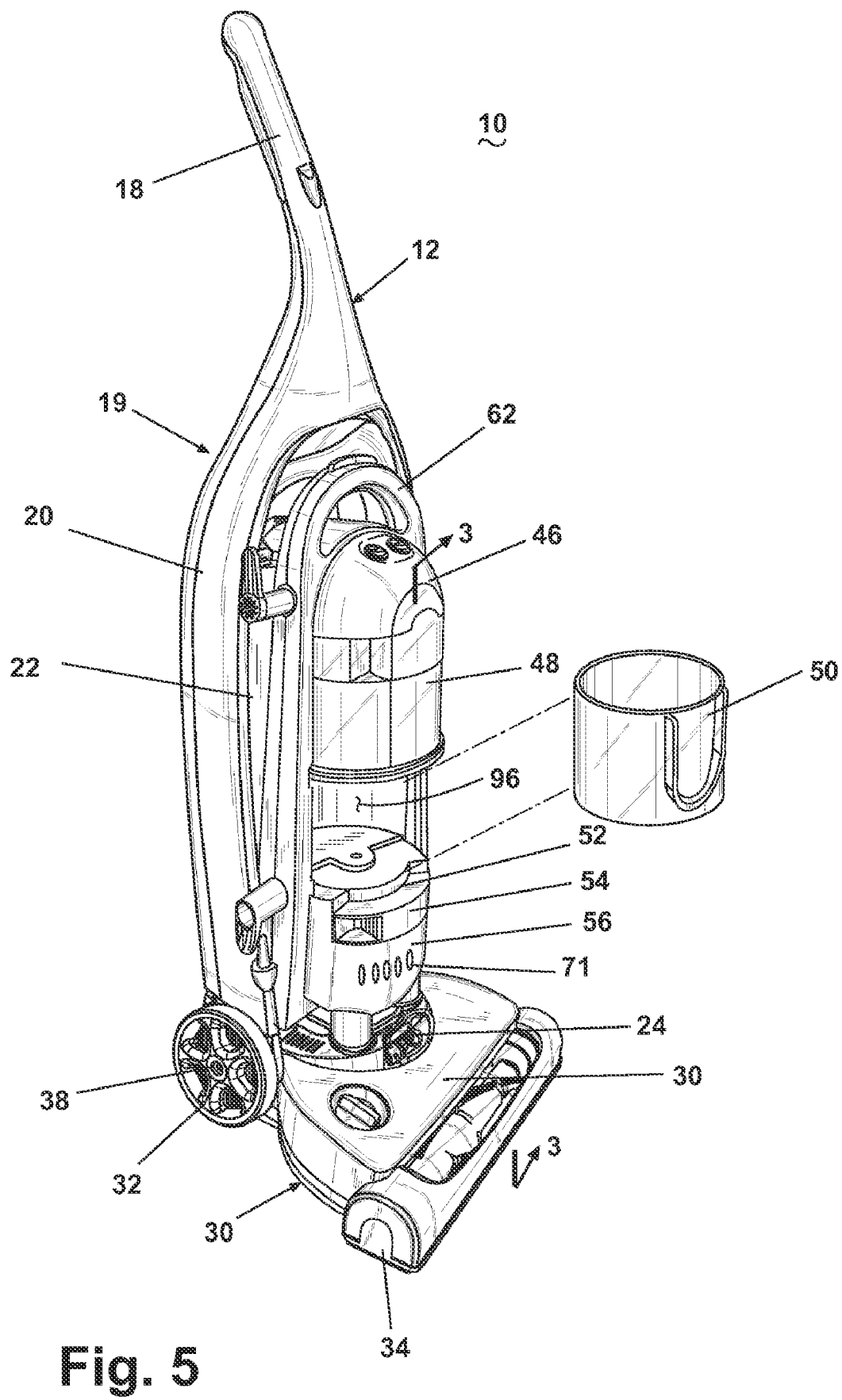
FIG. 5 is a perspective view of the multi-use vacuum cleaner of FIG. 1 with the dirt cup removed.

Referring to FIG. 5, dirt cup latch 52 comprises a lever that rotates about a center axis inline with the fan motor assembly 64. A pair of mating ramps raise and lower an upper surface of the dirt cup latch 52 as the dirt cup latch is moved from side to side. Removable dirt cup 50 is supported by an upper surface of the dirt cup latch 52 in a cavity 96 in the module 16. As dirt cup latch 52 is moved to the lower setting, the removable dirt cup 50 moves down separating from the cyclonic separator 48 and allows the dirt cup 50 to be removed from the detachable cyclonic vacuum module 16. One commercially available embodiment of the dirt cup latch is found in the Clean-View Model 3591 bagless upright vacuum cleaner sold by BISSELL Homecare, Inc.

Figure 4:
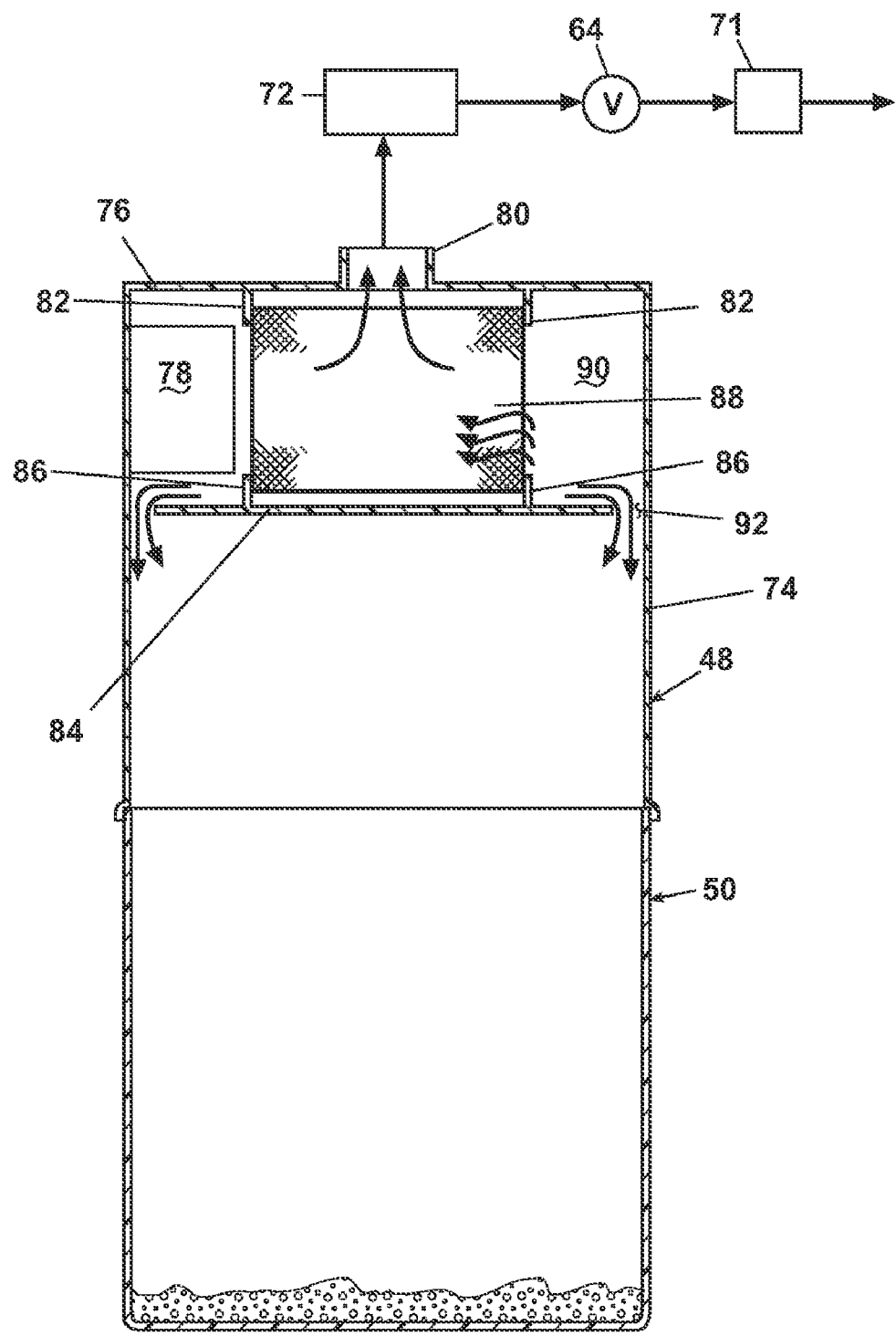
FIG. 4 is a front cross sectional view of the cyclonic separator for a vacuum module as shown in FIG. 1.

Referring to FIGS. 3 and 4, cyclonic separator 48 comprises a cylindrical sidewall 74, a circular upper wall 76 and a cyclone air inlet aperture 78. Circular upper wall 76 further comprises an exhaust outlet 80 comprising a centrally located aperture therethrough. A collar 82 depends from a lower surface of upper wall 76. A separator plate 84 in the form of a solid disk having an upstanding annular collar 86 is located in spaced relation below the upper wall 76. In the preferred embodiment, the upstanding annular collar 86 is aligned with the depending collar 82 of the upper wall 76. A cylindrical screen 88 is retained at the ends thereof by each of the collars 82, 80. In this manner, separator plate 84 is suspended from upper wall 76, forming a toroidal chamber 90 between the cylindrical screen 88 and the side wall 74, and between the upper wall 76 and the separator plate 84, respectively. In the preferred embodiment, air inlet aperture 78 is vertically aligned between upper wall 76 and separator plate 84 such that tangential airflow generated from air inlet aperture 78 is directed into the toroidal chamber 90.

With further reference to FIGS. 3 and 4, the tangential air-flow containing particulate matter passes through the inlet air aperture 78 and into toroidal chamber 90 and travels around the cylindrical screen 88. As the air travels about the toroidal chamber 90, heavier dirt particles are forced toward sidewall 74. These particles fall under the force of gravity through a gap 92 defined between an edge of separator plate 84 and the sidewall 74. Referring particularly to FIG. 4, dirt particles falling through the gap 92 drop through and are collected in the dirt cup 50. The upper end of the dirt cup 50 is received in a nesting relationship to the side wall 74 to seal the dirt cup 50 with the cyclone separator 48. As the working inlet air traverses through toroidal chamber 90, casting dirt particles towards sidewall 74, the inlet working air is drawn through cylindrical screen 88, through exhaust outlet 80, and into an outlet air conduit 60. Outlet air conduit 60 is integrally molded in a rear wall of module housing 46. Air moves through outlet air conduit 60 to the pre-motor filter 72. Pre-motor filter 72 removes additional particulate matter from the exhaust airstreams prior to the airstreams being drawn through the fan motor assembly 64. A post-motor filter 71 can also be provided downstream of the fan motor assembly 64 to remove additional fine particulate matter from the exhaust airstream before it is released to the atmosphere. An example of a suction cleaner with cyclonic dirt separation may be found in U.S. Patent Application Publication No. US2002/0011050 to Hansen et al. and is incorporated herein by reference in its entirety.

All of the elements that create suction are contained within the cyclonic vacuum module 48. When the detachable cyclonic vacuum module 16 is attached to the upright handle assembly 12 the device may be operated as an ordinary upright vacuum cleaner. When power is applied to the fan motor assembly 64, fan 66 turns creating an airflow. Suction is created at suction nozzle 40 thus drawing debris into the working air path. Dirt laden air continues to flow through the working air conduit 40 into hose 58 through inlet air aperture 78 whereby the dirt laden air is forced to rotate within the cyclonic separator 48, thus separating the dirt from the air. Clean air then passes through cylindrical screen 88 through exhaust outlet 80, through outlet air conduit 60 and into fan chamber 56 as previously described. With the detachable cyclonic vacuum module 16 detached from the upright handle assembly 12, the flexible hose 58 hose fitting 94 can be removed from the air coupling interface 44. Thus the user can attach the upholstery tool 26 to the hose fitting 94, and utilize the detachable cyclonic vacuum module 16 as an effective portable upholstery cleaning device.

Figure 6:
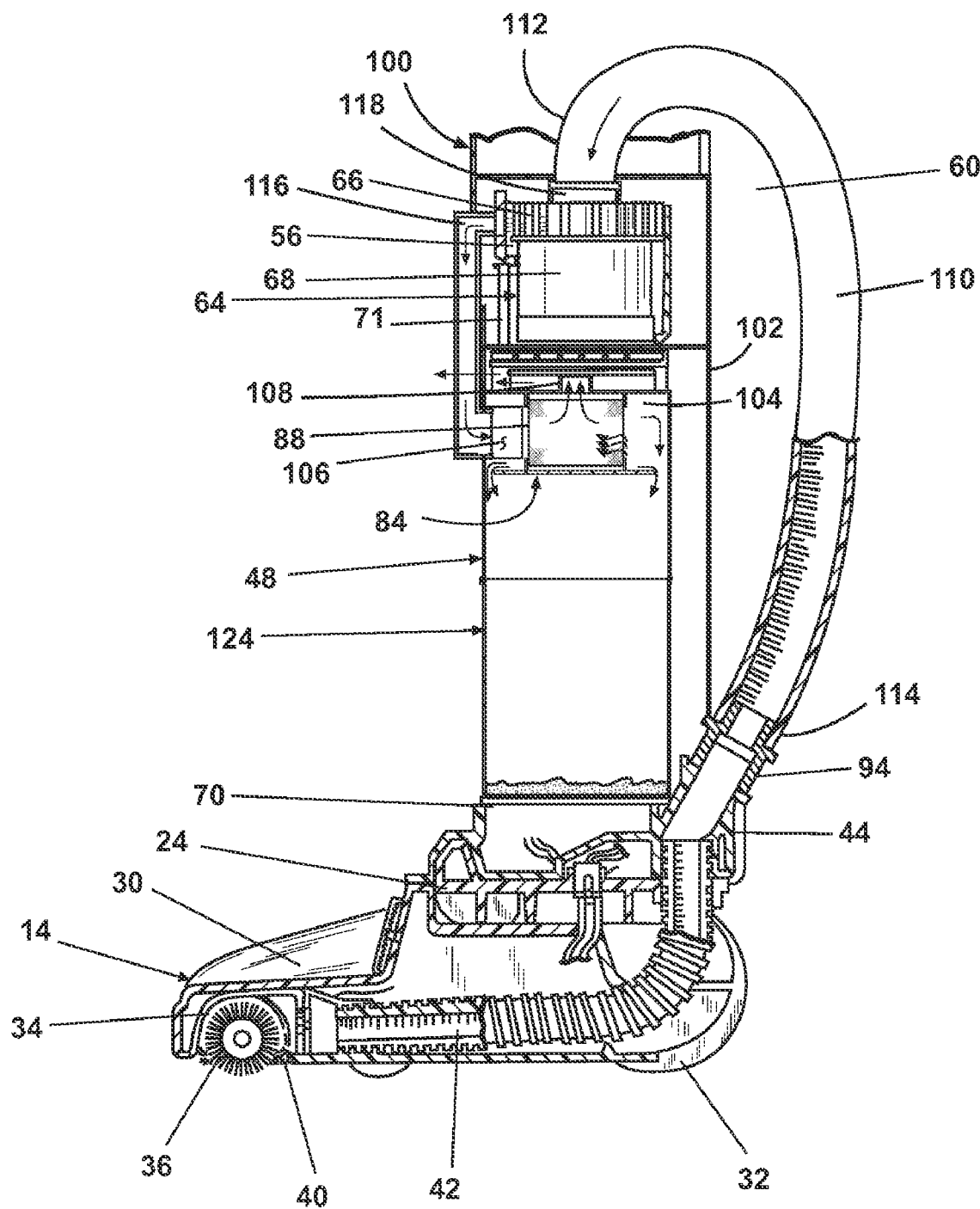
FIG. 6 is a schematic view of an alternative embodiment of the module illustrated in FIGS. 1–5 according to the invention.

Referring now to FIG. 6 where like numerals have been used to describe like parts, a detachable cyclone cleaning module 100 includes a module housing 102, a cyclone separation chamber 104 formed within the module housing 102, a flexible suction conduit 110 and a motor driven fan 66. The cyclone separation chamber has an inlet opening 106 and an outlet opening 108. The flexible suction conduit 110 has a first end 112 connected to the housing and a second end 114 with hose coupling 94 that is adapted to mount into the module platform suction opening when the cleaning module is mounted to the module platform 24 (FIGS. 1–3) and is freely movable when the cleaning module is removed from the module platform 24. The motor driven fan 66 has an inlet opening 118 that is connected to the suction conduit first end 112 and an outlet opening 116 that is connected to the inlet 106 to the cyclone separation chamber 104. The outlet to the cyclone separation chamber 104 is connected to a filter to remove remaining dirt and dust fines that are not separated from the air in the cyclone separation chamber 104. A dirt cup 124 is mounted in the module housing beneath the cyclone separation chamber to collect dirt and dust separated from the air in the cyclone separation chamber.

While the invention has been specifically described in connection with certain embodiments thereof, it is to be understood that this is by way of illustration and not of limitation. Reasonable variation and modification are possible within the scope of the forgoing description and drawings without departing from the spirit of the invention, which is described in the appended claims.

The invention claimed is:

1. A vacuum cleaner comprising:
   a foot assembly having a suction nozzle and a working air conduit connected at one end to the suction nozzle, and adapted to move along a surface to be cleaned;
   an upright handle assembly pivotally mounted to said foot assembly for manipulation of the foot assembly along the surface to be cleaned and including:
      an elongated structural support comprising a pair of spaced tubes pivotally mounted at a lower portion to the foot assembly and forming a handle grip at an upper portion;
      a portable cleaning module detachably mounted as a unit to the elongated structural support between the spaced tubes and comprising:
         a module housing;
         a cyclone separation chamber into which dirt laden air is tangentially introduced through an inlet thereto and mounted in the module housing for separating dust and dirt from dirt-laden air;
         a suction conduit having a first end connected to the module housing in fluid communication with the inlet of the cyclone separation chamber and a coupling at a second end adapted to be removably connected to another end of the working air conduit; and
         a motor-driven fan supported in the module housing for creating suction within the suction conduit and for moving the dirt laden air to the inlet of the cyclone separation chamber; and
      whereby when the portable cleaning module is mounted to the elongated structural support, the vacuum cleaner functions as an upright vacuum cleaner and the motor-driven fan draws dirt-laden air from the suction nozzle in the foot assembly through the suction conduit and moves the dirt-laden air to the inlet of the cyclone separation chamber, and wherein when the portable cleaning module is removed from the elongated structural support, the vacuum cleaner functions as a portable vacuum cleaner and the motor-driven fan draws dirt laden air from the second end of the suction conduit and moves to the inlet of the cyclone separation chamber.

2. The vacuum cleaner according to claim 1 wherein the suction conduit is at least in part flexible for movement of the second end thereof with respect to the module housing during use of the portable cleaning module when it is detached from the elongated structural support.

3. The vacuum cleaner according to claim 2 wherein the cyclone separation chamber has an outlet and the motor driven fan has an inlet connected to the cyclone separator chamber outlet.

4. The vacuum cleaner according to claim 2 wherein the motor driven fan has an inlet connected to the first end of the suction conduit and an outlet connected to the cyclone separator chamber inlet.

5. The vacuum cleaner according to claim 3 wherein the portable cleaning module further includes a dirt cup removably mounted in the module housing beneath the cyclone separation chamber to collect dirt separated from air therein.

6. The vacuum cleaner according to claim 5 wherein the module housing further includes a handle integrally formed at an upper portion thereof.

7. The vacuum cleaner according to claim 1 and further comprising a module platform mounted to the elongated structural support and including an opening at an upper surface thereof, the opening forms the other end of the working air conduit and the suction conduit second end is removably coupled to the opening.

8. The vacuum cleaner according to claim 1 wherein the module housing further includes a handle for hand carrying the module.

9. The vacuum cleaner according to claim 8 wherein the handle is at an upper portion of the module housing.

10. A vacuum cleaner comprising:
  a foot assembly having a suction nozzle and a working air conduit connected at one end to the suction nozzle, and adapted to move along a surface to be cleaned;
  an upright handle assembly pivotally mounted to said foot assembly for manipulation of the foot assembly along the surface to be cleaned and including:
    an elongated structural support pivotally mounted at a lower portion to the foot assembly and forming a handle grip at an upper portion;
    a portable cleaning module detachably mounted as a unit to the elongated structural support and comprising:
      a module housing;
      a cyclone separation chamber into which dirt laden air is tangentially introduced through an inlet thereto and mounted in the module housing for separating dust and dirt from dirt-laden air;
      a suction conduit having a first end connected to the module housing in fluid communication with the inlet of the cyclone separation chamber and a coupling at a second end adapted to be removably connected to another end of the working air conduit; and
      a motor-driven fan supported in the module housing for creating suction within the suction conduit and for moving the dirt laden air through the cyclone separation chamber, the motor driven fan having an inlet connected to the first end of the suction conduit and an outlet connected to the cyclone separator chamber inlet; and
  whereby when the portable cleaning module is mounted to the elongated structural support, the vacuum cleaner functions as an upright vacuum cleaner and the motor-driven fan draws dirt-laden air from the suction nozzle in the foot assembly through the suction conduit and moves the dirt-laden air to the inlet of the cyclone separation chamber, and wherein when the portable cleaning module is removed from the elongated structural support, the vacuum cleaner functions as a portable vacuum cleaner and the motor-driven fan draws dirt laden air from the second end of the suction conduit and moves the dirt laden air to the inlet of the cyclone separation chamber.

11. The vacuum cleaner according to claim 10 wherein the suction conduit is at least in part flexible for movement of the second end thereof with respect to the module housing during use of the portable cleaning module when it is detached from the elongated structural support.

12. The vacuum cleaner according to claim 10 wherein the portable cleaning module further includes a dirt cup removably mounted in the module housing beneath the cyclone separation chamber to collect dirt separated from air therein.

13. The vacuum cleaner according to claim 10 wherein the module housing further includes a handle integrally formed at an upper portion thereof.

* * * * *